Feb. 23, 1960 W. L. GEORGE ET AL Re. 24,787

STERILIZATION OF COLLAGENOUS SUTURES WITH EPOXIDES

Original Filed Jan. 15, 1957

INVENTORS:
WILLIAM L. GEORGE
JAMES J. EBERL
BY
ATTORNEY

United States Patent Office

Re. 24,787
Reissued Feb. 23, 1960

24,787

STERILIZATION OF COLLAGENOUS SUTURES WITH EPOXIDES

William L. George, New Brunswick, N.J., and James J. Eberl, Moylan, Pa., assignors to Johnson & Johnson, a corporation of New Jersey Original No. 2,817,437, dated December 24, 1957, Serial No. 634,353, January 15, 1957. Application for reissue December 23, 1958, Serial No. 782,614

24 Claims. (Cl. 206—63.3)

Figure 1:
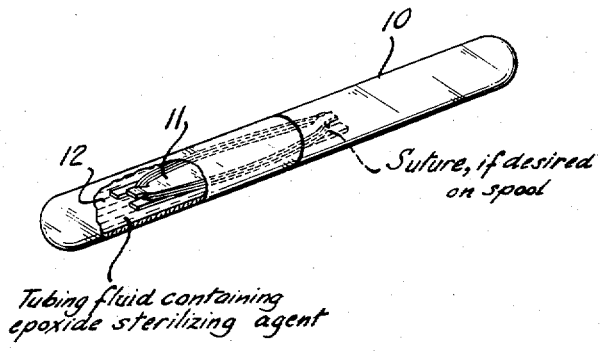

Matter enclosed in heavy brackets [ ] appears in the original patent but forms no part of this reissue specification; matter printed in italics indicates the additions made by reissue.

This application is a continuation in part of Serial No. 302,004, now abandoned.

This invention relates to sterilization of proteinaceous materials with epoxide sterilizing agents, especially surgical sutures.

The well-known "catgut" sutures made from sheep or other animal intestines are proteinaceous or collagenous in composition and hence are markedly affected by water, and to a much greater extent by combined heat and water. Excessive amounts of water tend to swell the suture, which is undesirable, while heat and water together hydrolyze the collagen thereby weakening the suture.

The suture itself must, of course, be sterile when it is used and, in addition, must be packaged in a receptacle which, at the time it is carried into the operating room is sterile also. However, heat or steam sterilization procedures ordinarily used for other articles are not compatible with the sensitivity of "catgut" to these conditions as described above. Chemical sterilizing agents have been proposed. A satisfactory chemical sterilizing process should not unduly swell the suture and should not cause appreciable decrease in tensile strength. Absorbability of the suture by body tissues should not be lessened. Many of such processes are too rigorous in their action and even the milder ones heretofore known produce deleterious effects on the more sensitive articles such as collagenous sutures.

An object of the invention is to develop a method for sterilizing articles, particularly sutures made from animal intestines, which does not cause deterioration of the article being sterilized, and which does not materially decrease absorbability of the animal intestine sutures. A further object is to discover a way of modifying and controlling epoxide sterilization procedure to make it applicable to treatment of less refractory materials. Other objects and advantages of the invention method will appear hereinafter.

According to the invention, articles are sterilized by treating them with liquid epoxide in certain concentration, in the presence of a controlled amount of moisture.

A preferred modification of the invention is based on the discovery that certain compounds, termed herein as modifiers, when added to liquid epoxide sterilizing agents permit sterilization of articles without deleterious action toward the article being sterilized which might otherwise occur; i.e., by adding to the mixture one of the invention modifiers which are ammonium salts of the lower molecular weight (8 carbon atoms or less) aliphatic soluble hydroxy carboxylic acids. The amount of modifier and ratio of ammonia to acid therein are preferably such as to produce a controlled pH in the mixture as described more fully below. Further the temperature is at a level which will avoid degradation of the article, and the sterilizing conditions are maintained for time to effect sterility.

In the description of the invention reference will be made to the accompanying drawing, which shows a tubed suture, the tubing fluid of which includes epoxide sterilizing agent.

Referring to Figure I of the accompanying drawing, a proteinaceous or catgut suture 11 (arranged in any desired fashion) is enclosed in a tube 10 (hermetically sealed), and the tubing fluid 12 completely covers the suture. This tubing fluid contains the epoxide sterilizing agent.

Sterilization according to the invention procedure, as applied to sterilization of sutures, is carried out as follows. The "catgut" suture to be sterilized is preferably first dried, as for example with warm air. Its moisture content is preferably reduced to below about 8% by weight. The suture then may be wound upon a suitable spool, the spool and suture inserted into the top of a closed-bottom glass tube and the tubing fluid and epoxide sterilizing agent added to the tube so as to cover the suture. Preferred tubing fluids are isopropyl alcohol or ethyl alcohol. However, any fluid which will dissolve the required amounts of water, epoxide and modifier may be employed. The fluid should also be nondeleterious to the suture.

The ethylene oxide or propylene oxide are volatile and hence are usually handled in the form of solutions that are either aqueous or dissolved in the tubing fluid itself. If desired, however, the epoxide may be maintained under pressure to prevent excessive volatilization. Epoxide content is sufficient to produce sterility, generally at least 0.01%, desirably at least 0.25% by weight of the fluid, and preferably at least about 0.50%. Concentrations above 2.5% may cause undesirable effects in the article sterilized, and hence are usually avoided. The volume percentage is about 1.1 times the percentage by weight.

To promote activity of the epoxide sterilizing agent, the presence of certain minimum amounts of water is important. We have found in the invention process that the minimum amount of water for reliable and consistent results in sterilization is about 2½% by weight. However, in the case of sutures, water also affects the pliability (brittleness) and swelling thereof. With isopropyl alcohol tubing fluid, water content of the fluid should be maintained at least about 5% by weight to preserve pliability of the sutures. Above about 20% water in isopropyl alcohol, undue swelling of the sutures has been found to occur. Hence the broad range of water content in isopropyl alcohol is 5 to 20%. Preferred isopropyl alcohol tubing fluids contain 8 to 12% water. In the case of ethyl alcohol tubing fluids, similar rules apply but the broad range of water content is about 2 to 10% and the preferred range 4 to 6%.

An outstanding feature of the invention method is using a sterilizing agent modifier, whereby the articles are sterilized without deleterious effect thereon. The modifiers contemplated are ammonium salts of the lower molecular weight aliphatic carboxylic acids. The amount of modifier and ratio of ammonia to acid therein are preferably controlled to produce in the final fluid mixture a pH within certain ranges. Ammonium lactate is a particular and preferred modifier in the invention method. It is suitably incorporated into the fluid by first adding the required amount of lactic acid, at least 0.25% by weight, and then adding ammonium hydroxide until the pH has been raised to the desired level. The pH range is about 5.0 to about 8.5. In the case of ethylene oxide sterilizing agent, the preferred pH range is about 5.0 to about 7.0. According to the invention method, amounts of ammonium lactate corresponding to not more than about 5% lactic acid, and pH's of about 5.0 to about 7.0 for ethylene oxide and 5.0 to 8.5 for propylene oxide effect sterilization with substantially no deterioration in properties. Since certain of the modifiers have a plasticizing and swelling effect on sutures, fluids used for suture sterilization will generally contain not more than 2.5% modifier, preferably not more than about 1.0%.

After adding solvent, water, epoxide, and a modifier to the suture or other article in the tube, the tube is sealed off and stored at normal room temperature conditions for time sufficient to bring about sterilization of the suture. In this period the epoxide is substantially decomposed. The time required will depend in part upon the temperature level maintained. In general, temperatures above about 50° F., are used. Above about 100° F., deterioration of the suture may take place, and accordingly such higher temperatures are avoided. Normal room temperatures are suitable and hence are preferred, at which temperature substantially complete disappearance of the epoxide and complete sterilization of the suture will take place in about ten days to two weeks.

It is an important advantage of the invention method as indicated above that the sutures become sterilized without undergoing appreciable swelling or reduction in tensile strength, and that absorbability is not materially affected thereby.

The invention method has been described mainly as applied to "catgut" sutures. However, it will be apparent that the method is also applicable to sutures other than those prepared from animal intestines and, broadly considered, other materials which are adversely affected by sterilization with liquid epoxides.

The following examples are submitted as illustrations of the invention. The examples do not, however, limit the invention since other embodiments not illustrated come within its scope. Although the language of the examples describes a single test, the results reported represent consistent data from a large number of experiments.

EXAMPLE I

A "catgut" suture, prepared from sheep intestines, and having an original diameter of about 0.022" and about 12% moisture content, is wound upon a spool and placed in a vertical tube having its bottom end sealed and top end open. The suture is contaminated by adding to it a suspension of B. subtilis and drying. A tubing fluid consisting of 90% by weight isopropyl alcohol, 1% ethylene oxide, 1% lactic acid with sufficient ammonium hydroxide to increase the pH to 6.5, and the balance water, is then added to the tube so as to cover the suture therein. The tubing fluid is prepared as follows: 700 ccs. of 99% isopropyl alcohol is mixed with 14 ccs. of 50% aqueous lactic acid solution and 49 ccs. of water. 28% aqueous ammonium hydroxide is then added until the pH is increased to 6.5. To 130 ccs. of this stock solution there is added 1.80 ccs. of ethylene oxide (to produce a 1% by weight ethylene oxide content). After adding the tubing fluid, the tubes are sealed and the sutures allowed to stand at room conditions for ten days. The sample tubes are then opened and portions of the tube contents transferred to a thioglycolate medium using aseptic technique. After a fifteen day incubation period, the sutures are examined and all found to be sterile. Control tests run in a manner identical with those described above, except that no ethylene oxide is used, are all non-sterile.

Some of the samples are subjected to aging tests for one year at room temperature. At the end of this time the tubes are opened and the suture is tested for swelling and tensile strength. They are found to have undergone substantially no swelling and to have suffered substantially no decrease in tensile strength.

In tests similar to Example I wherein no ammonium lactate is added to the tubing fluid, there will be found, upon aging, a reduction in tensile strength of about 50% and increase in diameter due to swelling of about 10%.

EXAMPLE II

Example I is repeated except that propylene oxide is used in place of ethylene oxide and the pH is adjusted to 8.5, using ammonium hydroxide, instead of 6.5 as in Example I. After being stored for thirty days at room temperature, the tubes are opened and found to be sterile. Parallel control of tests without propylene oxide are found non-sterile. The samples are subjected to aging tests and examined after storage for one year at room temperature. The sutures are removed from the tubes and tested for swelling and tensile strength. They are found to have undergone no substantial decrease in tensile strength and no substantial increase in diameter as compared with the properties of the original unsterilized suture.

Tests in which the Example II procedure is repeated except that no ammonium lactate is added, show substantial decrease in tensile strength (50% of the original) and substantial increase in diameter (10% of the original) due to swelling upon being subjected to aging tests by storage at room temperature for one year.

EXAMPLE III

The procedure of Example I is repeated except that 2.5% lactic acid is added to the tubing fluid and the pH is adjusted to 5.5 with ammonium hydroxide. At the end of 12 months storage time at normal temperature conditions, the suture diameter measures 0.0226", the knot pull strength is substantially greater than the minimum required by U.S.P., and there is no trace of ethylene oxide in the tubing fluid.

As a result of a series of in-vivo tissue implantation studies, it was found that "catgut" sutures sterilized by this new process were equally as absorbable as sutures sterilized in the usual manner. However, in the case of the ethylene oxide or propylene oxide sterilized "catgut" there is an indication that attack is slower at first increasing with time to a point where it finally completely absorbs in about the same length of time as cumolized gut.

Thus the ethylene oxide or propylene oxide sterilized gut has the advantage of retaining a greater strength when the wound is weakest and suture strength is most needed. This is a completely unpredictable result.

The materials of the foregoing examples give acceptable values when tested for digestion in a papain solution, e.g., according to the following procedure:

Eight-inch lengths of the material to be tested are placed side by side forming a loop of the material, and the two cut ends are treated as one double strand. A single overhand throw-knot is tied approximately ¼ of an inch from the cut ends, thus forming a loop about 3¾ inches long. These samples may be placed in glassine envelopes, and may be stored therein for several days if necessary.

The digestion is carried out in tubes 1 inch in diameter and 4 inches long. These are placed in a constant temperature bath at 37.8° C. (100° F.). Twenty grams tension is placed on the loop, e.g., by means of a lever and weight arrangement. The digestion (breaking of the gut) time may be measured manually. Alternatively, a mercury switch may be fastened to the lever so that when the loop is intact and submerged in the digestion solution, current flows through an electric timer. When the loop breaks, the lever with the twenty gram weight changes position, switching off the current. Only the time during which the loop was subjected to digestion is recorded on the timer.

The digestion solution comprises:

Buffer solution (1.0 liter)

| | | |
|---|---|---|
| Potassium phosphate-dibasic $K_2HPO_4$ anhydrous | g | 174.22 |
| Sodium borate $Na_2B_4O_7 \cdot 10H_2O$ | g | 38.15 |
| Distilled water | cc | 1000 |

Papain solution (1.0 liter)

| | | |
|---|---|---|
| Buffer solution (above) | cc | 100 |
| Thiourea $CS(NH_2)_2$ | g | 76 |
| Distilled water | cc | 800 |
| Powder papain (optimo white brand S. B. Penick & Company) | g | 30 |

and may be prepared in a stainless steel beaker using an electric stirrer with a stainless propeller and shaft. The water and the buffer solution are poured into the stainless steel beaker and the speed of the stirrer is adjusted for vigorous mixing without splashing. The buffer and water are allowed to mix while the thiourea is being weighed out. This is then poured carefully into the stirring mixture and allowed to dissolve while the papain powder is being weighed out. The weighed papain powder is then placed into a large mortar. When the thiourea has dissolved, a quantity of the solution (from 200–300 cc.) is dipped out with a beaker. A small amount of this solution is added to the papain powder in the mortar which is mixed to form a heavy paste. The heavy paste is rubbed, until all the lumps have been broken; then more of the solution from the beaker is added until a thin paste forms. This is transferred to the stainless steel beaker. The remainder of the "dipped" solution is used to rinse the mortar into the stainless steel beaker. Mixing is continued with the stirrer, preferably for about at least 5 hours, and the solution is allowed to stand covered overnight at room temperature. Standing for a weekend has no adverse effect on activity.

The resulting solution is filtered, the liquid layer being carefully poured off into another container without disturbing the sediment. A filter aid (such as Filter Cel) is mixed into the liquid (about 5 teaspoons per liter of solution) and the mixture is allowed to stand while vacuum filtration apparatus is set up. The filtration apparatus consists of a filtering flask (4 liter) and a Buchner funnel (about 20 cm. in diameter). A disk of filter paper (Whatman #1) is placed in the funnel, wet with distilled water and pressed flat, covering all the holes. The mixture of papain solution and filter aid is stirred and immediately poured into the funnel in such a manner as not to disturb the filter paper. If the filtrate comes through cloudy, it is poured back and refiltered until it comes through clear. When the liquid fraction has been filtered, the sediment from the first step is filtered. The resulting filter cake is then washed with 50 cc. of distilled water per liter of papain solution. The filtrate is measured and diluted to the desired volume with distilled water. This solution should be used within a period of two weeks, after which decreasing activity of the solution makes it useless.

Just before use, the above solution is mixed with an activator made up of 100 cc. of distilled water containing 4.75 grams of meta sodium bisulfite ($Na_2S_2O_5$) or 5.2 grams of sodium bisulfite ($NaHSO_3$) which chemical dissolves easily in the water, in the following proportions (per sample of test material):

| | | |
|---|---|---|
| Papain solution | cc | 24.0 |
| Activator | cc | 1.0 |

Since the activity of the papain solution is variable, it is necessary to have a method of standardization. For this, a size-0, unbleached, non-hardened (i.e., non-tanned) non-boilable gut is used, and it should digest in 1.8 hours.

At least three such standard digestions should be run with each batch of test digestions. If the standard digests in 1.8 hours, direct test batch time readings may be made. If there is a difference, i.e., 1.5 for the standard, a conversion factor must be used to get the proper digestion time for the material. This factor is found by dividing 1.8 by the time of digestion of the standard; in this case 1.8/1.5=1.20. All readings in this case must be multiplied by the factor (in this case 1.20) to obtain the correct values.

If all of the advantages of the foregoing modifications of the invention are not required, the sterile sutures which meet minimum U.S.P. tensile strength requirements and having acceptable papain digestion characteristics may be prepared as follows:

EXAMPLE IV

A number 2A plain gut suture is tubed by the procedure of Example I in a solution of 2% ethylene oxide by volume in 85% isopropanol (aqueous). The sealed inoculated tubes are allowed to stand at room conditions for one week. The resulting sutures are subjected to standard sterility tests and all found to be sterile, whereas the corresponding control tubes (no ethylene oxide added) are all found to be non-sterile. The tensile strength for five of the sterile sutures is as follows:

| | Lbs. |
|---|---|
| (1) | 20.0 |
| (2) | 19.2 |
| (3) | 22.1 |
| (4) | 22.2 |
| (5) | 19.4 |

Average 20.6 lbs. (U.S.P. minimum for No. 2 catgut; 13 lbs.). This clearly shows that the sterile sutures prepared in accordance with this modification of the invention clearly meet minimum U.S.P. tensile strength requirements.

The papain digestion breaking time for five of the sterile sutures (using the above described procedure) is:

| | Hours |
|---|---|
| (1) | 1.8 |
| (2) | 6.1 |
| (3) | 2.5 |
| (4) | 2.1 |
| (5) | 5.0 |
| Average | 3.5 |

These data clearly show that the sterile sutures prepared in accordance with this modification of the invention are clearly within acceptable absorption requirements; i.e., at least 3 hours desirably at least 6 hours, and preferably at least 11 hours.

EXAMPLE V

A number 2A plain gut suture is tubed by the procedure of Example I in a solution of 2% ethylene oxide by volume in 87% isopropanol (aqueous). The sealed inoculated tubes are allowed to stand at room conditions for one week. The resulting sutures are subjected to standard sterility tests and all found to be sterile, whereas the corresponding control tubes (no ethylene oxide added) are all found to be non-sterile. The tensile strength for five of the sterile sutures is as follows:

| | Lbs. |
|---|---|
| (1) | 23.6 |
| (2) | 20.4 |
| (3) | 20.4 |
| (4) | 22.2 |
| (5) | 20.6 |

Average 21.4 lbs. (U.S.P. minimum for No. 2 catgut: 13 lbs.). This clearly shows that the sterile sutures prepared in accordance with this modification of the invention clearly meet minimum U.S.P. tensile strength requirements.

The papain digestion breaking time for five of the sterile sutures (using the above described procedure) is:

| | Hours |
|---|---|
| (1) | 6.3 |
| (2) | 5.3 |
| (3) | 4.7 |
| (4) | 6.7 |
| (5) | 6.8 |
| Average | 6.0 |

Comparable results to the foregoing are achieved using various modifications thereof. For instance, with a number 2A plain gut, and a 1.33% by weight solution of ethylene oxide in 90% isopropanol (aqueous), tensile strength is about 25, the papain digestion average of five tubes is 11.25 hours (range 6.0 to 23.0), and the reduction in shrinkage temperature is about 6° C. In a similar test except using 0.5% ethylene oxide, the tensile strength is about 27.65 lbs., the papain digestion time is 11.88 hours average (range 9.3 to 18.7) and the decrease in shrinkage temperature is about 2° C. Other suture materials may be treated in accordance with this invention as descrdibed hereinabove, including tanned gut, chromic gut, and the like.

In view of the foregoing disclosures, variations or modifications thereof will be apparent, and it is intended to include within the invention all such variations and modifications except as do not come within the scope of the appended claims.

We claim:

1. A method of sterilizing collagenous suture material by immersing it in a liquid comprising about 2.5 to 20% of water based on the weight of the liquid, a sterilizing epoxide of the group consisting of ethylene oxide and propylene oxide in an amount of the range of about 0.25 to 2.5%, for a time in the range of about 10 to 14 days and a temperature in the range of about 50 to 100° F., the improvement which comprises carrying out said method in the presence of an ammonium salt of a hydroxy carboxylic acid having not more than 8 carbon atoms in an amount to provide a pH in the range of about 5.0 up to about 7.0 in the case of ethylene oxide and up to about 8.5 in the case of propylene oxide, and a solvent for said salt water and epoxide which is nondeleterious to said collagenous material, whereby said collagenous suture material is sterilized without causing substantial deterioration thereof.

2. A method of claim 1 wherein the hydroxy carboxylic acid is lactic acid.

3. A method of claim 2 wherein the lactic acid salt is present in an amount equivalent to 0.25 to 5.0% lactic acid.

4. A method of claim 1 wherein the suture material is prepared from animal intestines.

5. A method of claim 4 wherein the hydroxy carboxylic acid is lactic acid and the salt thereof is present in an amount equivalent to 0.25 to 2.5% lactic acid.

6. A method of claim 5 carried out in a sealed tube wherein the epoxide is ethylene oxide, the equivalent amount of lactic acid is 0.25 to 1%, and pH is in the range of 5.0 to 7.0.

7. A method of claim 6 wherein the solvent is isopropyl alcohol.

8. A method of claim 7 wherein the amount of lactic acid is 1%.

9. A method of claim 8 wherein the suture material is dried to a moisture content not substantially above about 8% by weight prior to immersion in the liquid, and wherein the liquid mixture contains 8 to 12% water.

10. A method of claim 5 wherein the solvent is ethyl alcohol.

11. A method of claim 4 carried out in a sealed tube wherein the epoxide is propylene oxide, the equivalent amount of lactic acid is 0.25 to 1%, and the pH is in the range of 5.0 to 8.5.

12. A method of claim 11 wherein the solvent is isopropyl alcohol.

13. A method of claim 12 wherein the amount of lactic acid is 1%.

14. A method of claim 13 wherein the suture material is dried to a moisture content not substantially above about 8% by weight prior to immersion in the liquid, and wherein the liquid mixture contains 8 to 12% water.

15. A catgut suture conforming to minimum U. S. P tensile strength suture requirements, said suture comprising a sterile reaction product of a strand of catgut with a solution containing ethylene oxide, the ethylene oxide being about .01 to 2.5% by liquid volume of the solution, said reacted catgut having an average breaking time of at least about 3 hours using an aqueous papain solution and conditions such that the average breaking time for a standard size-0, unbleached, non-hardened, non-boilable gut is 1.8 hours.

16. An interiorly sterile sealed container containing a tubing fluid and a flexible sterile catgut suture conforming to a minimum U. S. P. tensile strength suture requirements, said suture comprising a sterile reaction product of a strand of catgut with a solution containing ethylene oxide, the ethylene oxide being about .01 to 2.5% by liquid volume of the solution, said reacted catgut having an average breaking time of at least about 3 hours using an aqueous papain solution and conditions such that the average breaking time for a standard size-0, unbleached, non-hardened, non-boilable gut is 1.8 hours.

17. A container of claim 16 with an average breaking time of at least 6.

18. A container of claim 17 with an average breaking time of at least 11.

*19. A catgut suture conforming to minimum U.S.P tensile strength suture requirements, said suture comprising a sterile reaction product of a strand of catgut with a solution containing about 2.5 to 20% of water based on the weight of the solutions and about 0.01 to 2.5% of ethylene oxide by liquid volume of the solution, said reacted catgut having an average breaking time of at least about 3 hours using an aqueous papain solution and condition such that the average breaking time for a standard size-0, unbleached, non-hardened, non-boilable gut is 1.8 hours.*

*20. An interiorly sterile sealed container containing a tubing fluid and a flexible sterile catgut suture conforming to a minimum U.S.P. tensile strength suture requirements, said suture comprising a sterile reaction product of a strand of catgut with a solution containing about 2.5 to 20% of water based on the weight of the solution and about 0.01 to 2.5% of ethylene oxide by liquid volume of the solution, said reacted catgut having an average breaking time of at least about 3 hours using an aqueous papain solution and conditions such that the average breaking time for a standard size-0, unbleached, non-hardened, non-boilable gut is 1.8 hours.*

*21. An interiorly sterile sealed container containing a tubing fluid and a flexible sterile catgut suture conforming to minimum U.S.P. tensile strength suture requirements, said suture comprising a sterile reaction product of a strand of catgut with a solution containing about 2.5 to 20% of water based on the weight of the solution and about 0.01 to 2.5% of ethylene oxide by liquid volume of the solution.*

*22. The method of sterilizing a catgut suture which comprises storing an unreacted catgut suture with a tubing fluid, hermetically sealed in a container, said tubing fluid comprising a solution of about .01 to 2.5% of ethylene oxide by liquid volume and about 2.5 to 20% of water by weight of the solution and maintaining said sealed container at a temperature in the range of*

*about 50° to 100° to effect sterilization of the catgut by reaction of the ethylene oxide while maintaining minimum U.S.P. tensile strength suture requirements and rendering said catgut flexible.*

*23. An interiorly sterile sealed container containing a tubing fluid and a flexible sterile catgut suture according to claim 20 wherein the ethylene oxide is in an amount from about 0.25 to 2.5% by volume.*

*24. The method of sterilizing a catgut suture according to claim 22 wherein the ethylene oxide is in an amount from about 0.25 to 2.5% by volume.*

References Cited in the file of this patent
or the original patent

UNITED STATES PATENTS

| | | |
|---|---|---|
| 2,640,752 | Davis et al. | June 2, 1953 |
| 2,738,059 | Elson | Mar. 13, 1956 |